US005261684A

United States Patent [19]

Soto

[11] Patent Number: 5,261,684

[45] Date of Patent: Nov. 16, 1993

[54] DISMOUNTABLE WHEELCHAIR AND BAG FOR TRANSPORTING SUCH A WHEELCHAIR AFTER DISMOUNTING

[76] Inventor: Pierre J. Soto, Prat Debes-St. Jean de Fos, 34150 Gignac, France

[21] Appl. No.: 730,824

[22] PCT Filed: Nov. 27, 1990

[86] PCT No.: PCT/FR90/00856

§ 371 Date: Nov. 5, 1991

§ 102(e) Date: Nov. 5, 1991

[87] PCT Pub. No.: WO91/07935

PCT Pub. Date: Jun. 13, 1991

[30] Foreign Application Priority Data

Nov. 28, 1989 [FR] France ................................ 89 15647

[51] Int. Cl.[5] ................................................ B62M 1/14

[52] U.S. Cl. ................................ 280/250.1; 280/304.1; 280/650; 305/7

[58] Field of Search ..................... 280/250.1, 304.1, 42, 280/647, 649, 650, 657; 301/1, 5.1, 5.23; 305/6, 7

[56] References Cited

U.S. PATENT DOCUMENTS

| | | | |
|---|---|---|---|
| 970,291 | 9/1910 | Baisden | 305/7 |
| 3,381,973 | 5/1968 | Carr | 280/250.1 |
| 4,462,605 | 7/1984 | Morgan | 280/250.1 |
| 4,593,929 | 6/1986 | Williams | 280/650 |
| 4,770,432 | 9/1988 | Wagner | 280/250.1 |
| 4,887,826 | 12/1989 | Kantner | 280/250.1 |
| 5,071,196 | 12/1991 | Sbarro | 305/7 |

FOREIGN PATENT DOCUMENTS

| | | | |
|---|---|---|---|
| 3819925 | 4/1989 | Fed. Rep. of Germany . | |
| 3904150 | 7/1990 | Fed. Rep. of Germany | 280/250.1 |
| 1503807 | 8/1989 | U.S.S.R. | 280/250.1 |
| 2206088 | 12/1988 | United Kingdom | 280/250.1 |
| 8103610 | 12/1981 | World Int. Prop. O. | 280/250.1 |

*Primary Examiner*—Margaret A. Focarino
*Assistant Examiner*—Anne Marie Boehler
*Attorney, Agent, or Firm*—Pandiscio & Pandiscio

[57] ABSTRACT

A wheelchair including two large carrying wheels mounted on opposite sides of a central frame is provided. One portion of the central frame is collapsible and is designated to support a seat. Another portion of the central frame defines a footrest. Steering wheels associated with the footrest also are provided. Each carrying wheel includes an outer ring and an inner ring. The outer and inner rings are concentrically oriented relative to each other such that the outer periphery of the inner ring and the inner periphery of the outer ring engage bearing elements located therebetween. The outer periphery of the outer ring is adapted to support a tire. The volume defined by the inner ring is devoid of any axle, shaft, or spoke. The frame is attached to the inner ring of the adjacent carrying wheels by releasable connectors.

20 Claims, 4 Drawing Sheets

DISMOUNTABLE WHEELCHAIR AND BAG FOR TRANSPORTING SUCH A WHEELCHAIR AFTER DISMOUNTING

The present invention relates to a wheelchair, of the type comprising two large carrying wheels mounted on either side of a central frame, one portion of which supports a seat and another portion of which constitutes a footrest provided with steering wheels.

Wheelchairs of this type most often have a collapsible structure so that they can be stowed away in confined spaces, in particular in the boot of an automobile.

By reason of the way in which they collapse, generally like a pantograph, presently known wheelchairs nonetheless take up considerable room once collapsed which, added to the fact that certain parts still project, makes it particularly inconvenient to transport them by hand.

The present invention aims to overcome this drawback and, for this purpose, provides a wheelchair of the type specified in the introduction and which is characterized in that each of its carrying wheels is formed of a rim which, bearing the tyre, directly constitutes the outer ring of a peripheral rolling bearing, the large diameter inner ring of which, free of any hub, axle, shaft or spoke, bears the frame fixed to it by releasable fixing means.

One thus obtains a wheelchair all the elements of which can be dismounted, among which the carrying wheels, completely hollow internally, can, by being superposed, delimit a housing capable of receiving all or part of the other constituent elements of the chair, thus appreciably reducing the overall dimensions of the dismounted chair. To minimize these overall dimensions, a certain number of complementary arrangements have, moreover, been provided.

Thus, according to an additional characteristic of the invention, the seat of the wheelchair and the part of the frame that supports it form an assembly which is separate from the footrest and has a collapsible structure designed and dimensioned in such a way that, once separated from the wheels and collapsed, said assembly forms a packet the volume of which is quite entirely contained in that delimited by two superposed carrying wheels.

Furthermore, the footrest, which is independent of the rest of the frame, has the shape of a closed hoop projecting forwardly of the carrying wheels and maintained at its rear between them by releasable means for fixing to their respective inner rings, this hoop advantageously having, in all directions, external dimensions which are at the most equal to those of the space delimited by the two superposed carrying wheels as well as an internal length and width preferably greater than the corresponding dimensions of the packet constituted by the seat and its support, dismounted and folded.

Complementarily, each of the steering wheels of the chair is preferably supported by a pivoting prop mounted on a respective lateral wing of the hoop by an articulation having its axis perpendicular to the pivoting axis of the prop, and comprising a retractable member for immobilization in extended position.

Thanks to these arrangements, it is indeed possible, after completely dismounting the chair, to stow away the constituent elements of the central portion of the latter inside the two large superposed carrying wheels to thus form a package the outside dimensions of which are confined to those of the latter and which can consequently be transported as a flat hand luggage taking up little space.

To facilitate the dismounting of the wheelchair, it is further provided, according to one characteristic of the invention, that the means for fixing the footrest hoop to the inner rings of the carrying wheels be constituted at each end of the rear wing of the said hoop by a lock bolt, provided with a notch, which slides into a striking plate with an internal spring catch, integral with the internal ring of the corresponding carrying wheel, and that, on each side of the seat supporting part of the frame, the means for fixing it to the respective inner ring include two groups, distant from one another along the periphery of the latter, of two assembly elements capable of snap fastening into one another, one of these elements being integral with the inner side of the inner ring and the other with the opposite side of said seat supporting portion of the frame.

The remounting of the chair will further be facilitated if, in each of the said groups, one of the assembly elements is a projecting finger ending in a ball and the other a receiving piece provided with a housing for inserting this finger and with a spring catch, the receiving piece of at least one of the groups having the form of a clamp in which the projecting finger engages laterally.

To guarantee the perfect rigidity of the assembled chair, it will be preferable, moreover, for the projecting finger to have, on at least one portion of its length, a polygonal cross-section, and for the housing provided in the receiving piece to have a cross-section matching that of the finger.

Finally, the position of at least one of the assembly elements of each group is adjustable along the inner side of the corresponding inner ring and/or respectively the opposite side of the seat supporting part of the frame to permit easy adjustment of the height of the seat or of its lateral or rearward inclination.

The dismountable wheelchair according to the invention can further be made self-propelled without thereby losing the aforementioned advantages, that is to say essentially the possibility of swift mounting and dismounting and the stowing away of its different constituent elements in a minimum volume, thus facilitating its transport.

For this purpose, each of the two carrying wheels of the chair is advantageously fitted with a motor carried by one of its rings and rotating the second ring via a transmission mechanism cooperating with the latter, the motor, and possibly its power supply source being retained inside the central opening of the wheel in question, without encroaching upon a space having, in the plane of the said wheel, dimensions smaller than the transverse and longitudinal dimensions of the hoop.

According to one preferred embodiment of this self-propelled wheel chair, the motor, and possibly its power supply source, is carried by the inner annular surface of the inner ring of the wheel under consideration, and the outer ring has a rim, an annular portion of which, bent back in front of the inner ring, cooperates with the said motor transmission mechanism.

Preferably, the said transmission mechanism is constituted by a pinion, or a set of pinions, engaging with an internally toothed wheel carried by the said bent back annular portion of the outer ring. Alternatively, it can consist of a friction roller, or a set of friction rollers, cooperating with a coating, having a high friction coefficient, of the said annular portion.

According to another characteristic, in a direction parallel to the axis of the wheel, the motor, with its transmission mechanism, and possibly its power supply, is of a dimension that is less than twice the thickness of the wheel and does not extend beyond a lateral outside plane of the latter.

Finally, the two assembly elements of at least one of the groups are advantageously provided respectively with electrically conductive inner portions, in mutual contact, each insulated from the outer body, forming ground, of the assembly element in question, so that, when the chair is remounted, said assembly elements can play the role of automatic electric connectors that can be used, in the case of an electric motor being employed, to close the electric circuit for controlling the latter.

A preferred form of embodiment of the wheelchair according to the invention will now be described in further detail, but solely by way of a non-limitative example, with reference to the accompanying drawings, wherein.

Figure 1:
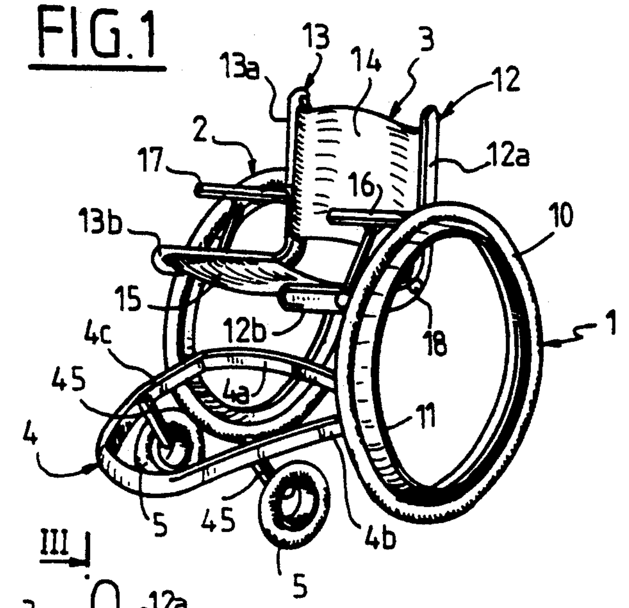
FIG. 1 is a perspective view of said wheelchair.

In a manner known per se, the wheelchair whereof an example is provided in FIG. 1, includes two large diameter carrying wheels 1,2, a seat 3 and a footrest 4 fitted, ahead of the carrying wheels, with two lateral steering wheels 5.

Figure 2:
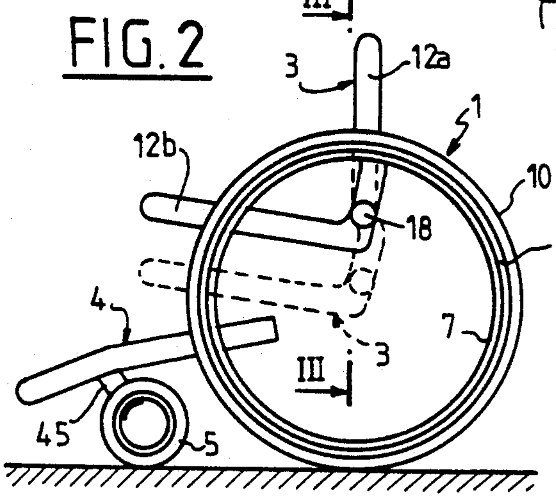
FIG. 2 represents it schematically, viewed from the side.
Figure 3:
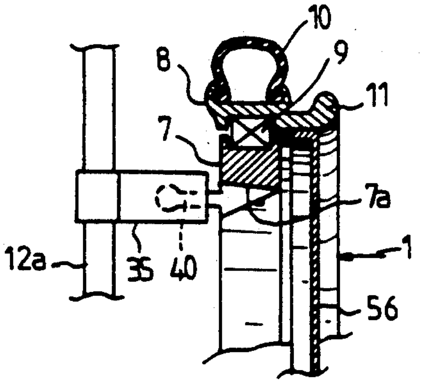
FIG. 3 is a partial cross-sectional view in plane III—III of FIG. 2.

According to the primary feature of the invention, illustrated jointly by FIGS. 2 and 3, each of the carrying wheels 1 or 2 is formed, like a rolling bearing, with two large diameter rings, 7,8, maintained in close contact, concentrically one around the other, by means of rollers 9 interposed between them peripherally, and the axes of which are perpendicular to the plane of the wheel. The annular, inner rings 7 of the two carrying wheels 1, 2 thus form fixed, entirely hollow elements retaining between them the support of seat 3 and the independent footrest 4, while the outer ring 8 of each wheel 1 or 2 constitutes its rim properly speaking with a tyre 10 disposed on its periphery and a handrail 11 formed so as to project on its outer side.

Figure 4:
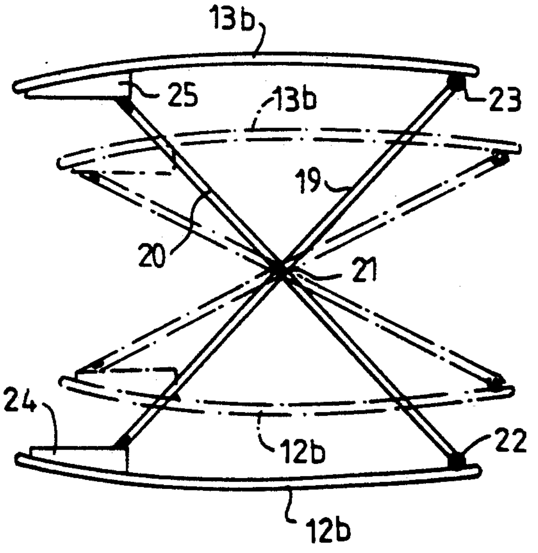
FIG. 4 is an enlarged view of the folding base of the chair seat.

The support of seat 3 is formed, for its part, essentially of two lateral L-shaped elements 12,13, the vertical wings 12*a* and 13*a* of which support the fabric back 14 of the seat, and the horizontal wings 12*b* and 13*b* of which support the separate seat portion 15, also made of fabric. In each lateral element 12 or 13 of the support, a folding double arm 16 or 17, forming an armrest, is articulated on one side on the vertical wing and, on the other side, on the horizontal wing, which wings are, moreover, joined by an articulation 18, self-locking in the right-angle extended position of the two wings. It is further to be noted, with reference to FIG. 4, that the two horizontal wings 12*b* and 13*b*, of supporting elements 12,13 are connected by a crossarm formed by two rods 19,20 articulated on one another at their middle 21 and respectively at the rear ends of wings 12*b*,13*b*, as indicated at 22 and 23. By their front ends, the two rods 19,20 each slide in a grooved piece 24 or 25 welded onto the inside of the respective horizontal wing. The same folding crossarm structure is present between the two vertical wings 12*a*,13*a* of supporting elements 12,13 of seat 3.

According to another feature of the invention, each supporting element 12,13 is assembled to the inner edge of the hollow inner ring 7 of a respective carrying wheel 1 or 2, by two point fixing devices, the first positioned on its horizontal wing 12*b* or 13*b* and the second on its vertical wing, 12*a* or 13*a*.

Figure 5:
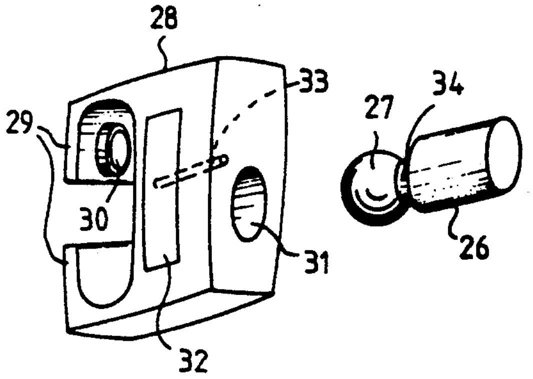

FIG. 5 represents the first of these fixing devices, which are identical for both of the support elements. It is composed, on one hand, of a finger 26 projecting on the inner side of ring 7, perpendicular to its plane and tangentially internally to it, and ending in a ball joint 27 and, on the other hand, by a piece 28, generally parallelepipedic in shape, which fits onto the horizontal wing 12*b* or 13*b*, having a rectangular cross-section, of support element 12 or 13 via a claw 29 having a matching shape, provided on the inside with an elastic catch 30 for locking piece 28. On the face, opposite claw 29, of piece 28, emerges an inner housing 31 of the latter into which ball joint equipped finger 26 is axially inserted. A catch 32, pivoting on a pin 33 and biased by a spring, not shown, or by the intrinsic elasticity of the material, projects slightly inside housing 31 in order to lock finger 26, after the latter has been inserted, by penetrating groove 34 provided between the finger and its ball joint 27.

Figure 6:
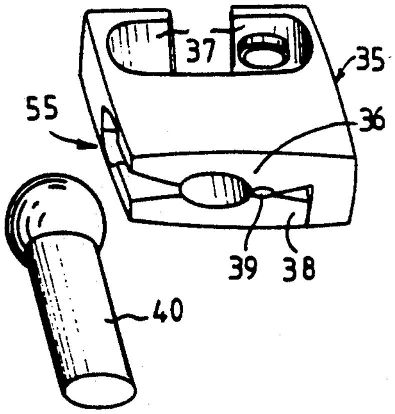
FIGS. 5 to 7 are enlarged perspective views of devices for fixing the different frame elements to the inner rings of the rolling bearings of the carrying wheels.

The second fixing device, which can be seen in FIG. 6, has the same overall structure as the first one, except that the parallelepipedic piece 35 here has the form of a clamp defined by fixed portion 36 bearing claw 37 and a mobile jaw 38 articulated about a longitudinal pin 39 and biased by a spring or by the inherent elasticity of the material. This clamp is open rearwards at 55 and ball joint equipped finger 40 engages therein laterally to be locked by the jaw inside piece 35.

Figure 7:
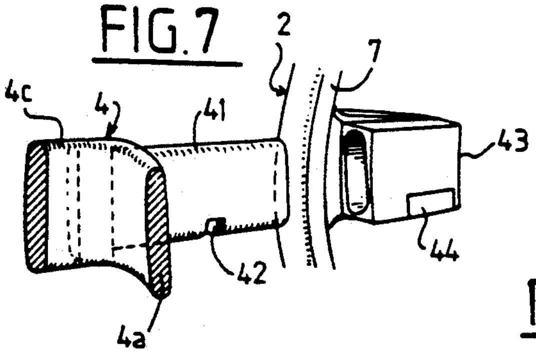

Returning now to FIG. 1, it can further be seen that footrest 4, without any connection to seat 3, is constituted by a closed hoop which bears, at each end of its rear wing 4*a*, a lock bolt 41, substantially perpendicular to the latter, represented in FIG. 7. This lock bolt 41, which has a slot 42, is inserted into a striking plate 43 integral with inner ring 7 of the corresponding carrying wheel, in a position slightly back towards the inside according to a radius thereof with respect to the inner periphery of said ring, said striking plate 43 being further provided with an elastic catch 44 which engages in slot 42 of the lock bolt to lock it.

It should be noted here that the largest outside dimensions, in terms of length and width, of the footrest hoop 4 are at most equal to the inside diameter of each of the hollow inner rings 7, and that the length of the space that it delimits is greater than that of each of wings 12*a*, 12*b*, 13*a*,13*b* of the support elements of seat 3. The inner annular surface of hollow inner rings 7 further is slightly tapered towards the inside of the chair, as represented at *7a* in FIG. 3 and, in the embodiment given by way of example, the outer length of hoop 4 is equal to the average inside diameter of each ring 7.

Figure 8:
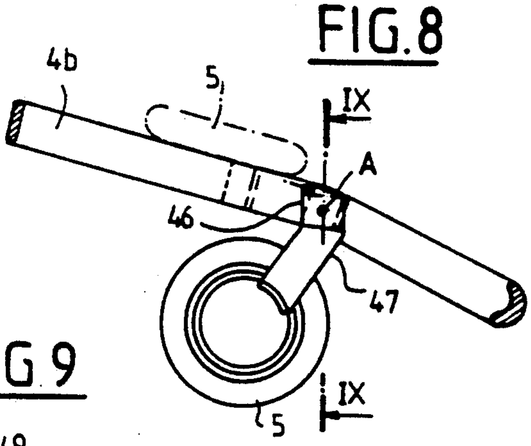
FIGS. 8 and 9 illustrate the method of mounting the props for supporting the steering wheels, FIG. 9 being a cross-sectional view in the plane IX—IX of FIG. 8.
Figure 9:
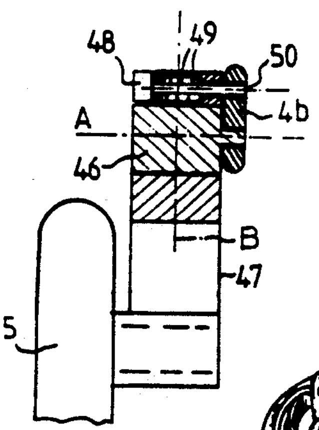

On each of the lateral wings 4*b*,4*c* of hoop 4 is further articulated a rearwardly inclined prop 45, which supports a respective steering wheel 5. As shown in FIGS. 8 and 9, each prop 45 is composed of an upper short piece 46 articulated on the inside of hoop 4 about an axis A parallel to that of wheel 5, and of a longer leg 47, pivoting under piece 56 about a second axis, B, perpendicular to the first axis A. A mobile pin bolt 48, biased by a spring 49, engages in a hole 50 of lateral wing 4*b* of the hoop to lock the prop, in relation to its axis A, in its functional position shown in solid lines in FIG. 8.

Figure 10:
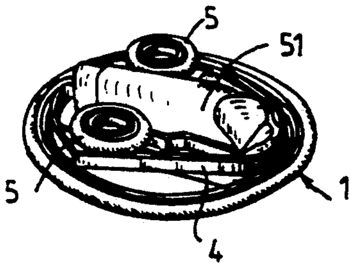

All the constituent elements of the wheelchair that has just been described, namely the two carrying wheels 1,2, seat 3 and footrest hoop 4, can easily be separated from one another by pulling slightly on their mutual snap fastening devices, represented in FIGS. 5 to 7. Once dismounted, the chair can be made to form a packet with minimum outside dimensions in the following way:

Initially, after their bolts 48 have been manually removed, props 45, together with their wheels 5, are pivoted successively upwards and sideways about their axes A and B so as to fold back the wheels flat against hoop 4 and inside its contour, as shown in dot and dash lines in FIG. 8. Then, the support of seat 3 is completely folded back about the articulations 21 of its crossarms 19,20, as shown in dot and dash lines in FIG. 4, and those, 18, of its lateral support elements 12,13, and the pieces of fabric 14,15 are wrapped around the support of the seat thus folded to form a packet 51. After one wheel has been placed horizontally, supported on its handrail, hoop 4 with its wheels 5 folded back is then installed inside its hollow portion. The latter is thus located inside inner ring 7 of the wheel by friction on its surface *7a*, which is sufficiently tapered to retain it. Then, inside the hoop and between folded wheels 5 is placed packet 51, as shown in FIG. 10, wherein the upper carrying wheel has been removed for the sake of clarity, it being pointed out that, when the latter is put into place, the two wheels 1 and 2 pressed together mutually immobilize one another by means of fingers 26 and 40, which engage at a tangent with soft friction each of the conical surfaces *7a* of their inner rings 7.

Figure 11:
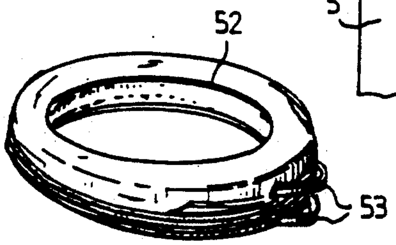
FIGS. 10 and 11 represent the chair completely dismounted and stowed in a cover for hand transport.

The package thus formed, rigidified by the connections provided by friction between the two wheels, can then be covered around carrying wheels 1,2 by a toroidal circular cover 52 having a U-shaped section and fitted with handles 53, as illustrated in FIG. 11. The package can thus be easily transported in the form of hand luggage taking up little space. Toroidal cover 52 can, of course, be replaced by a circular cover entirely closed in the centre.

It is specified here that carrying wheels 1 and 2 can advantageously, according to FIG. 3, receive an outer disk 56 located inside the handrail and occupying all its surface, being fixed thereto removably or otherwise, in such a way that the volume thus obtained between the two disks 56 of the two superposed wheels 1 and 2 delimits a receptacle capable of containing all the elements described above. The two wheels 1,2 with their disk 56 thus form a rigid, completely closed transport container that can, itself, be fitted with cover 52.

The wheelchair can be assembled just as easily as it is dismounted, by snap fastening.

One begins by assembling the two carrying wheels 1,2 to the lateral elements 12,13 of the support of seat 3, previously unfolded. To do so, projecting fingers 26 of their inner ring 7 are first of all snapped axially into the respective complementary pieces 28 of the horizontal wings of lateral elements 12,13; then, using the axis formed by the two fingers 26, the whole seat is swung backwards so as to snap fasten automatically, via the jaw pieces 35 of the vertical wings of its lateral support elements, onto the corresponding fingers 40 of inner rings 7. The final operation consists in snap fastening from the front onto inner rings 7 of wheels 1,2, the hoop onto which wheels 5 have previously been put again in their operating position.

Although its carrying wheels 1,2 are completely devoid of any central core (spokes, hub and axle), the wheelchair according to the invention, once remounted, has a perfect rigidity imparted to it by the central frame, namely the support of seat 3 and the footrest hoop 4, assembled between inner rings 7, at three points mutually spaced along each of them.

Returning to FIG. 2, one can also appreciate that it is simple to adjust the height of seat 3 in relation to footrest 4, as well as its rearward inclination, obtained by means of claws 29 and 37 of snap fastening pieces 28 and 35, which make it possible to modify easily the position of the latter along the respective wings of support elements 12,13 of seat 3. Complementarily, it is also necessary for the corresponding fingers 26 and 40 to be displaceable along each rim 7 or increased in number. In FIG. 2, seat 3 is represented as simply lowered and inclined rearwards, in dot and dash lines, but it as also conceivable, thanks to the means of adjustment provided, to incline it to the left or right to compensate for the individual morphological characteristics of the patient and thus make him or her more comfortable.

The dismountable wheelchair according to the invention can further be made self-propelled by means of a number of simple arrangements that in no way rule out any of its advantages as described above.

Figure 12:
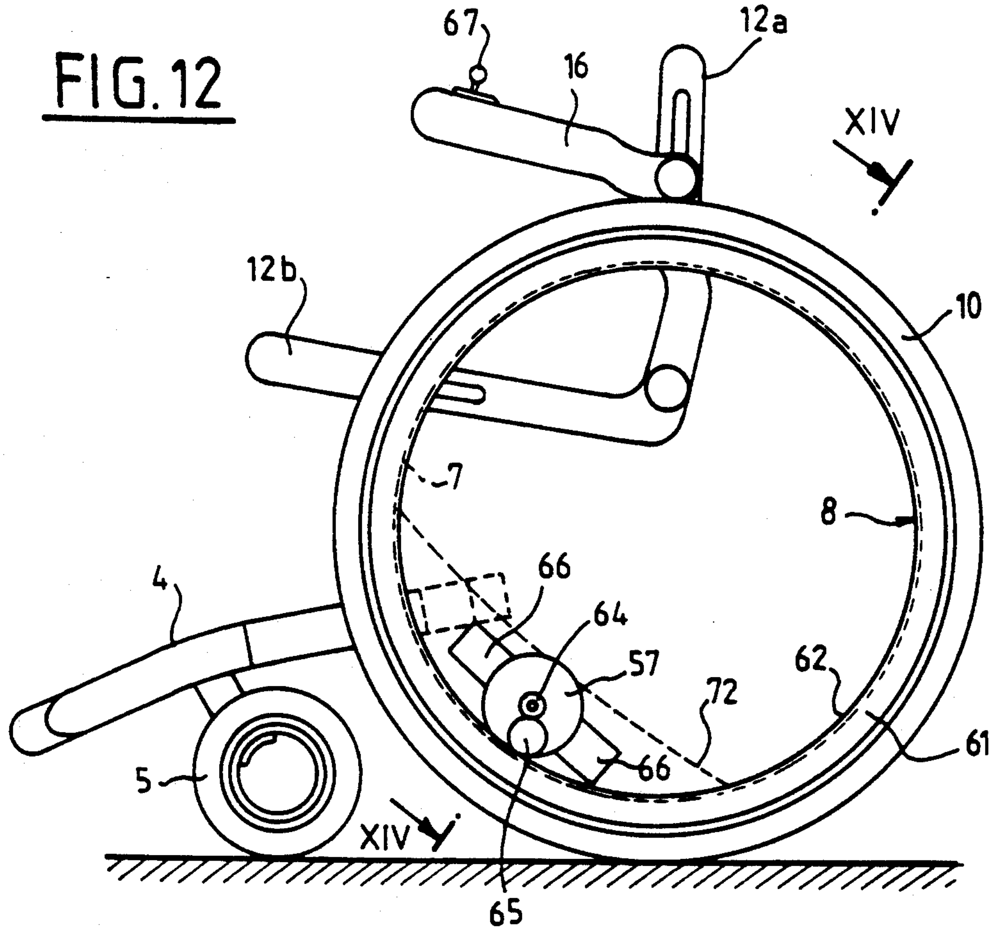
FIG. 12 is a schematic side view, on a large scale, of an improved wheelchair according to the invention.
Figure 14:
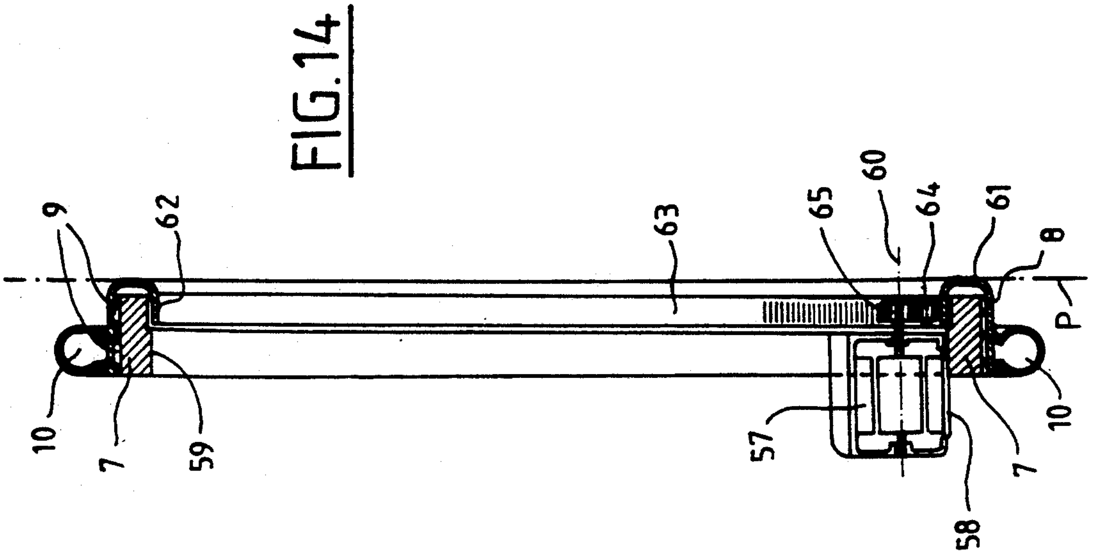
FIG. 14 is an enlarged cross-sectional view in plane XIV—XIV of FIG. 12.

FIG. 12 illustrates a preferred embodiment of such a self-propelled wheelchair the large carrying wheels 1,2 of which are first of all each equipped with a small direct-current electric motor 57, of a known type. As best illustrated in FIG. 14 in the case of wheel 1, this motor 57 as fixed, by its outer casing 58, to the inner annular surface 59 of inner ring 7 of this wheel. Motor 57, the fixing of which to inner wheel 7 will preferably be reinforced by lateral supports, not shown, is positioned in such a way that its shaft 60 is parallel to the axis of wheel 1 and is turned towards the outside of the latter.

FIG. 14 further shows that outer ring 8 of wheel 1 is provided, over its entire circumference, with a radial rim 61 which bends back in front of inner ring 7, slightly spaced from the latter. The bent back, annular continuous wing 62 of this rim 61 bears, on its outer surface, a gear wheel with internal teeth 63, centered on the axis of wheel 1, with which engages a pinion 64 mounted so as to be able to rotate freely on the front face of casing 58 of motor 57, this pinion itself engaging with a second pinion 65, keyed onto shaft 60 of the motor.

Mini-batteries 66, of a type commercially available, are fixed on either side of motor 57, on its casing 58, to ensure its electric power supply via a four-way switch, housed in the arm 16 of seat 3 of the chair, that is closer to the wheel 1 in question, where it can be actuated by means of a control handlever 67 (see FIG. 14).

Figure 13:
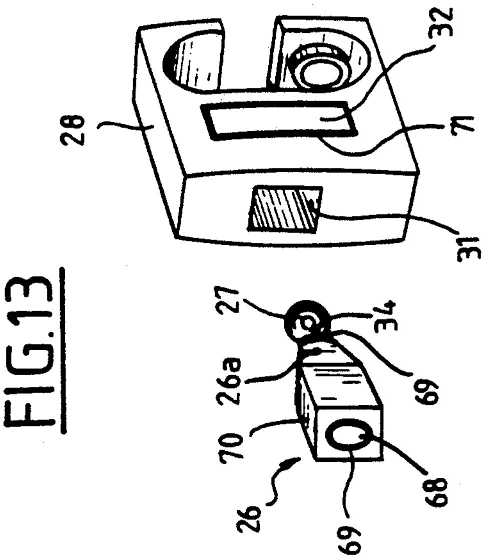
FIG. 13 is an exploded, enlarged perspective view of a fixing device, analogous to that of FIG. 5, with which the wheelchair according to FIG. 12 is fitted.

Electrical connection, provided using conventional circuitry between the batteries 66, the motor 57 and the lever switch 67, is effected using conducting wires which, between wheel 1 and seat 3, are interconnected via ball joint fingers 26 or 40 and the associated receiving pieces 28,35 of the devices for fixing seat 3 onto wheel 1. For this purpose, each finger, as illustrated in FIG. 13 in the case of 26, of the first fixing device, has a core 68, which is electrically conductive and which carries at its end ball joint 27 and is covered by an insulating sleeve 69, inside body 70, forming ground, of finger 26. Similarly, catch 32 is electrically insulated, at 71, in relation to the external body of piece 28.

Thus, electrical connection between a battery 66 and motor 57, through lever switch 67, is established automatically, when seat 3 is assembled to wheels 1 and 2 of the chair, and does not necessitate any additional operation when the chair is dismounted, practically instantaneously.

It will further be noted from FIG. 13 that finger 26 of the first fixing device has a polygonal section, here rectangular, and housing 31, into which it is inserted, has a precisely matching section. Perfect rigidity is thus ensured for the assembly effected between the support of seat 3 and wheel 1 which, as a result of these arrangements, can in fact withstand the mutual torsional stresses existing between the two elements 26 and 28 snap fastened to one another. The end portion 26*a* of finger 26 is further slightly tapered to facilitate the centering of the latter when it is introduced into housing 31 of piece 28.

It will be noted here that any suitable means other than the set of pinions 64,65 can be used to realize the kinematic coupling between the shaft 60 of motor 57 and toothed gear wheel 63 of outer ring 8 of wheel 1, by means of which the latter as rotated about fixed lower ring 7, in one direction or the other, and at a speed that can be selected, from control lever 67. This set of pinions can thus be replaced by a friction roller, or a set of such rollers, in contact with the inner annular surface 62, in this case smooth and provided with a coating having a high friction coefficient, of outer ring 8 of wheel 1.

Of course, the second carrying wheel 2 is arranged in the same way as the first, with a motor-battery group, electrical connections and a control, such as those described above.

It goes without saying, moreover, that, on one or the other of wheels 1,2, another type of motor can be used in place of the electric motor 57 given by way of example and, in particular, a small thermal motor associated with fuel tanks which would then take the place of batteries 66.

It will also be noted, with reference to FIG. 14 that, on each wheel 1 or 2, the shaft 60 of motor 57 does not extend beyond the outer lateral plane P of the wheel and that, on the other side, the body of the motor projects beyond inner ring 7 of the said wheel, but over a distance of less than the thickness of a wheel. Furthermore, the casing 58 of motor 57 is very slightly spaced apart from surface 7*a* of inner ring 7 of the wheel, to which it is welded.

Figure 15:
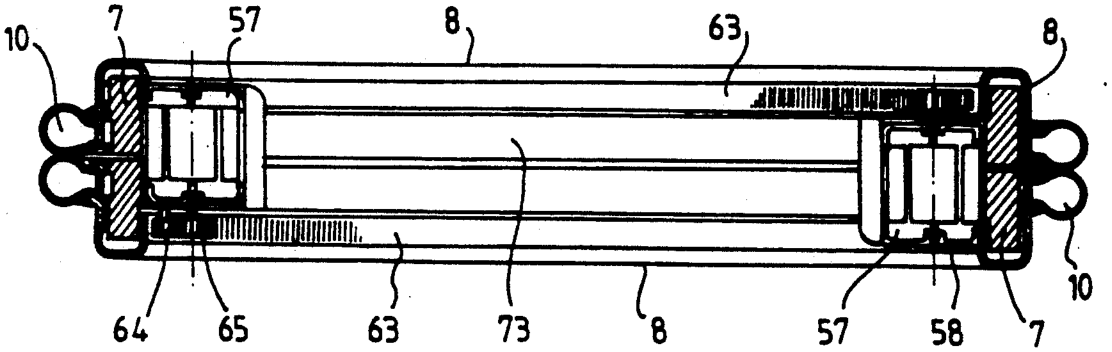
FIG. 15 is a cross-sectional view, in the same plane, of the two large wheels, arranged one in the other after dismounting, of the wheelchair of FIG. 12.

FIG. 15 shows how, thanks to these arrangements, the two wheels, 1 and 2, of the self-propelled wheelchair of FIG. 12 can be superposed on one another, without leaving any projecting portions, in the same way as for those of the wheelchair described previously.

Furthermore, in each of wheels 1 and 2, motor 57 and its batteries 66 are confined inside a housing delimited by inner ring 7 of the wheel 1 or 2 in question and a chord of this ring, symbolically represented by the dashed line 72 in FIG. 12. This chord 72, which can moreover take the physical form of a narrow plate further rigidifying the means fixing the motor, is in a position such that, after the two dismounted wheels, 1,2, have been superposed as shown in FIG. 15, motors 57, with their batteries 66, do not encroach on space 73 set aside, inside the two wheels, for installing hoop 4, in the centre of which is then placed packet 51 composed of seat 3, folded and wrapped round on itself, as shown in FIG. 10 as for the first non self-propelled wheelchair. Under these circumstances, just as in the case of the latter, the self-propelled wheelchair in FIG. 12 can, despite its additional features, be put, after dismounting, into the form of a package of minimum volume that can easily be transported in a bag having the shape of a toroidal cover, such as the one in FIG. 11.

I claim:

1. A wheelchair comprising two large carrying wheels, a central frame, a seat and at least one steering wheel, said central frame comprising, (i) a collapsible first portion having opposing first and second sides and supporting said seat and (ii) a second portion having a footrest section, said at least one steering wheel being attached to said second portion of said central frame substantially adjacent to said footrest section, each of said two large carrying wheels comprising a large diameter rolling bearing including an inner ring supporting said central frame and an outer ring defining a rim on said large carrying wheels, said inner ring of each of said large carrying wheels defining a wheel axle-free space and each of said first and second opposing sides of said central frame being secured to said inner ring of a respective carrying wheel at several spaced points on said inner ring by releasable fixing means, and wherein said central frame portions have dimensions such that, after disassembly of said wheelchair, said central frame portions form at least one packet having dimensions such that said at least one packet will fit within a space delimited by said two large carrying wheels when a side of one of said wheels is placed in superposed relation onto a side of the other of said wheels.

2. A wheelchair according to claim 1, wherein said second portion of said central frame is independent of said collapsible first portion of said central frame and said second portion of said central frame has the shape of a closed hoop projecting partially forwardly of said carrying wheels, said closed loop ring being maintained at the rear, between said inner rings of each of said two large carrying wheels, by portions of said releasable fixing means.

3. A wheelchair according to claim 2, wherein said hoop comprises, at least in a lengthwise direction, a dimension equal to the average inside diameter of said inner rings, and said inner rings each comprises an inner annular surface which tapers slightly as it extends from the inside of said inner ring towards the outside thereof.

4. A wheelchair according to claim 2, wherein said portions of said releasable fixing means for fixing said hoop to said two large carrying wheels each comprises a lock bolt and a striking plate; said lock bolt being provided with a slot and positioned on the periphery of said hoop; and said striking plate having an inner elastic catch adapted to engage said slot and being formed integrally with said inner ring of one of said carrying wheels such that said lock bolts may slidingly and lockingly engage said striking plates.

5. A wheelchair according to claim 1, wherein said hoop defines at least two lateral wing members, each of said wing members supporting a pivoting prop, with each of said steering wheels being supported by one of said pivoting props, said props each being mounted on a respective one of said lateral wings via an articulation having an axis (A) perpendicular to the pivotal axis (B) of the prop, said wheelchair further comprising a retractable member for immobilizing said prop in extended position.

6. A wheelchair according to claim 1, wherein at least one of said two large carrying wheels further comprises motor means carried by one of said rings, said motor means being engagingly coupled to the other ring of said at least one large carrying wheel by driving means, said motor means being retained inside said at least one large carrying wheel without encroaching upon a space having, in the plane of said at least one large carrying wheel, dimensions that are less than the transverse and longitudinal dimensions of said hoop.

7. A wheelchair according to claim 6, wherein said motor means, is carried by an inner annular surface of said inner ring of said at least one large carrying wheel, and said outer ring defines a rim including an annular portion that is bent back from said rim so as to be disposed adjacent the outer annular surface of said inner ring and cooperates with said drive means.

8. A wheelchair according to claim 7, wherein said drive means comprises at least one pinion engaging coupled to a gear wheel having inner teeth, said gear wheel being carried by said bent back annular portion of said outer ring.

9. A wheelchair according to claim 7, wherein said drive means comprises at least one friction roller, and said bent back annular portion of said outer ring further comprises a coating having a high friction coefficient.

10. A wheelchair according to claim 6, wherein said motor means and said drive means have a dimension of less than twice the thickness of said two large carrying wheels such that said motor means and said drive means do not extend beyond a lateral outside plane of the carrying wheels when said carrying wheels are placed in superposed side-by-side relation to each other.

11. A wheelchair according to claim 2, wherein said collapsible portion of said central frame and said seat supported thereby are adapted to collapse and be separated from said large carrying wheels so as to form said packet, said packet having longitudinal and transverse dimensions that are smaller than those of the space delimited by the inside of said hoop.

12. A wheelchair according to claim 11, characterized in that, on each of said first and second opposing sides of the seat supporting portion of the frame said releasable fixing means comprises two groups spaced from each other along the periphery of each inner ring, each of said groups comprising two assembly elements snap fastenable into one another, one of said two elements being formed integrally with an inner side of an inner ring of one of said large carrying wheels, and the other one of said two elements being formed integrally with said collapsible portion of said central frame.

13. A wheelchair according to claim 12, wherein in each of said groups, one of said two assembly elements comprises a projecting finger ending in a ball joint and the other of said two assembly elements comprises receiving means provided with a housing for receiving said finger and with an elastic catch, said receiving means of at least one of said groups comprising a clamp into which a corresponding projecting finger engages laterally.

14. A wheelchair according to claim 13, wherein said corresponding projecting finger comprises along at least a part of its length, a polygonal cross-section and said housing provided in said receiving means defines an opening having a cross-section substantially matching said polygonal cross-section of said finger.

15. A wheelchair according to claim 13, wherein an inner annular surface of each of said inner rings of said two large carrying wheels tapers slightly inwardly as it extends from the outer periphery of said inner ring to the inner periphery thereof and projecting fingers extend perpendicularly to the plane of a corresponding carrying wheel and tangentially to said annular surface of its inner ring.

16. A wheelchair according to claim 12, wherein at least one of the assembly elements of each group is adjustable along an inner side of said inner ring and the adjacent opposing portion of said collapsible portion of said central frame.

17. A wheelchair according to claim 12, wherein said two assembly elements of at least one of said groups comprise electrically conductive means for electrically interconnecting said central frame to at least one of said carrying wheels.

18. A wheelchair according to claim 1, wherein said outer ring of each said carrying wheel further comprises a means for closing the space delimited by said large diameter rolling bearing.

19. A wheelchair according to claim 6, wherein said motor means further comprises a battery power source, said power source being retained inside said volume without encroaching upon said space and having, in the plane of said at least one carrying wheel, dimensions that are less than said transverse and longitudinal dimensions of said hoop.

20. A wheelchair according to claim 1, further including a cover bag for transporting a package that comprises said two large carrying wheels superposed side-by-side onto each other, with said hoop positioned within the space delimited by said superposed carrying wheels, and said at least one packet positioned within said hoop, said cover bag comprising a toroidal, circular cover that embraces and conceals said package, and handles attached to said cover for transporting said bag.

* * * * *

UNITED STATES PATENT AND TRADEMARK OFFICE

CERTIFICATE OF CORRECTION

PATENT NO. : 5,261,684
DATED : November 16, 1993
INVENTOR(S) : Pierre J. Soto

It is certified that error appears in the above-indentified patent and that said Letters Patent is hereby corrected as shown below:

Claim 8, column 9, line 39, the word "engaging" should be changed to -- engagingly --.

Signed and Sealed this

Twelfth Day of April, 1994

Attest:

BRUCE LEHMAN

*Attesting Officer* *Commissioner of Patents and Trademarks*